US012335559B2

United States Patent
Marten

(10) Patent No.: US 12,335,559 B2
(45) Date of Patent: Jun. 17, 2025

(54) CONSOLIDATED WATCH PARTIES

(71) Applicant: DISH Network L.L.C., Englewood, CO (US)

(72) Inventor: Neil Marten, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/336,416

(22) Filed: Jun. 2, 2021

(65) Prior Publication Data

US 2022/0394328 A1 Dec. 8, 2022

(51) Int. Cl.
| | |
|---|---|
| H04N 21/43 | (2011.01) |
| H04L 65/611 | (2022.01) |
| H04N 21/442 | (2011.01) |
| H04N 21/475 | (2011.01) |
| H04N 21/4788 | (2011.01) |

(Continued)

(52) U.S. Cl.
CPC ..... H04N 21/43076 (2020.08); H04L 65/611 (2022.05); H04N 21/44218 (2013.01); H04N 21/4756 (2013.01); H04N 21/4788 (2013.01); H04N 21/8456 (2013.01); H04N 21/8547 (2013.01)

(58) Field of Classification Search
CPC ....... H04N 21/43076; H04N 21/44218; H04N 21/4756; H04N 21/4788; H04N 21/8456; H04N 21/8547; H04L 65/611
See application file for complete search history.

(56) References Cited

U.S. PATENT DOCUMENTS 6,081,830 A 6/2000 Schindler
6,237,025 B1 5/2001 Ludwig et al.
(Continued)

FOREIGN PATENT DOCUMENTS

CN 103290360 B 3/2016
CN 110430457 A 11/2019

OTHER PUBLICATIONS

"Be anyone and reface anything"—downloaded from the Internet on Nov. 3, 2021 from https://hey.reface.ai/.
(Continued)

*Primary Examiner* — John W Miller
*Assistant Examiner* — Akshay Doshi
(74) *Attorney, Agent, or Firm* — Wash Park IP Ltd.; John T. Kennedy

(57) ABSTRACT

A consolidated watch party system includes a sync server and a first user device communicatively coupled thereto. The sync server executes computer instructions instantiating a consolidation engine operable to assemble a watch party reel that includes a content segment and a prior reaction to the content segment and output the watch party reel to the first user device for presentation to a first user. The content segment may include a portion of a content presented during a watch party. The prior reaction may include chat data, captured during the watch party by a watch party user device, that includes a user reaction to the content. The prior reaction may include a facial response, an audible response, or other response. The consolidation engine selects the content segment, from a collection thereof, using a first tag associated therewith, generated by a source of the content segment, and/or corresponding to a criteria.

18 Claims, 2 Drawing Sheets

(51) Int. Cl.
  *H04N 21/845* (2011.01)
  *H04N 21/8547* (2011.01)

(56) References Cited

U.S. PATENT DOCUMENTS

| | | |
|---|---|---|
| 6,256,663 B1 | 7/2001 | Davis |
| 6,392,664 B1 | 5/2002 | White et al. |
| 6,519,771 B1 | 2/2003 | Zenith |
| 6,643,291 B1 | 11/2003 | Yoshihara |
| 6,646,673 B2 | 11/2003 | Caviedes et al. |
| 6,754,904 B1 | 6/2004 | Cooper et al. |
| 7,053,915 B1 | 5/2006 | Jung et al. |
| 7,143,428 B1 | 11/2006 | Bruck et al. |
| 8,015,306 B2 | 9/2011 | Bowman |
| 8,046,411 B2 | 10/2011 | Hayashi et al. |
| 8,046,801 B2 | 10/2011 | Ellis et al. |
| 8,223,185 B2 | 7/2012 | Gratton et al. |
| 8,316,400 B1 | 11/2012 | Kravets |
| 9,015,306 B2 | 4/2015 | Dupre et al. |
| 9,226,011 B2 | 12/2015 | Francisco |
| 9,252,950 B2 | 2/2016 | Caspi |
| 9,378,474 B1 | 6/2016 | Story |
| 9,471,809 B2 | 10/2016 | Garrett et al. |
| 9,544,624 B2 | 1/2017 | VanDuyn et al. |
| 9,654,817 B2 | 5/2017 | Li et al. |
| 10,135,887 B1 * | 11/2018 | Esser .................... H04L 65/612 |
| 10,158,917 B1 | 12/2018 | Logan et al. |
| 10,187,690 B1 | 1/2019 | Garcia et al. |
| 10,194,184 B2 | 1/2019 | Amento et al. |
| 10,237,587 B2 | 3/2019 | Zanabria et al. |
| 10,536,741 B1 | 1/2020 | Madison et al. |
| 10,575,042 B2 | 2/2020 | Rennison et al. |
| 10,735,825 B1 | 8/2020 | Comito et al. |
| 10,757,366 B1 | 8/2020 | Kwatra et al. |
| 10,757,467 B1 | 8/2020 | Katz et al. |
| 10,762,474 B2 | 9/2020 | Frank et al. |
| 10,819,758 B1 | 10/2020 | Krutsch et al. |
| 10,820,060 B1 | 10/2020 | Bosworth |
| 10,855,763 B2 | 12/2020 | Birrer et al. |
| 10,939,148 B2 | 3/2021 | Sun |
| 11,019,113 B2 | 5/2021 | Kurata et al. |
| 11,051,059 B2 | 6/2021 | Dodson et al. |
| 11,082,467 B1 | 8/2021 | Hartnett et al. |
| 11,128,916 B2 | 9/2021 | Mayhew et al. |
| 11,166,065 B1 | 11/2021 | Camargo et al. |
| 11,206,462 B2 | 12/2021 | Strickland |
| 11,259,069 B1 | 2/2022 | Hsieh et al. |
| 11,303,947 B2 | 4/2022 | Bertolami et al. |
| 11,477,516 B2 | 10/2022 | Yoden |
| 11,502,864 B2 | 11/2022 | Moorefield et al. |
| 11,503,090 B2 | 11/2022 | Wilkins et al. |
| 11,509,726 B2 | 11/2022 | Alsina et al. |
| 11,553,159 B1 | 1/2023 | Rothschild et al. |
| 11,570,218 B1 | 1/2023 | Roberts et al. |
| 11,588,869 B2 | 2/2023 | Gratton et al. |
| 11,606,597 B2 | 3/2023 | Iyer et al. |
| 11,695,722 B2 | 7/2023 | Madduluri et al. |
| 11,758,245 B2 | 9/2023 | Marten |
| 11,762,917 B2 | 9/2023 | Frank et al. |
| 2002/0067909 A1 | 6/2002 | Iivonen |
| 2003/0009766 A1 | 1/2003 | Marolda |
| 2003/0097655 A1 | 5/2003 | Novak |
| 2003/0149988 A1 | 8/2003 | Ellis et al. |
| 2003/0229900 A1 | 12/2003 | Reisman |
| 2004/0154040 A1 | 8/2004 | Ellis |
| 2004/0025811 A1 | 10/2004 | Grandy et al. |
| 2005/0204387 A1 | 9/2005 | Knudson |
| 2005/0262542 A1 | 11/2005 | Deweese et al. |
| 2006/0009766 A1 | 1/2006 | Lee |
| 2006/0010102 A1 | 1/2006 | Labossiere et al. |
| 2006/0013208 A1 | 1/2006 | Rietschel et al. |
| 2006/0101022 A1 | 5/2006 | Yu et al. |
| 2006/0149850 A1 | 7/2006 | Bowman |
| 2006/0161621 A1 | 7/2006 | Rosenberg |
| 2006/0174312 A1 | 8/2006 | Ducheneaut et al. |
| 2006/0236352 A1 | 10/2006 | Scott |
| 2006/0271960 A1 | 11/2006 | Jacoby et al. |
| 2007/0157281 A1 | 7/2007 | Ellis et al. |
| 2007/0229651 A1 | 10/2007 | Nakajima |
| 2007/0283380 A1 | 12/2007 | Aoki |
| 2008/0037785 A1 | 2/2008 | Gantman et al. |
| 2008/0163285 A1 | 7/2008 | Tanaka et al. |
| 2009/0063983 A1 | 3/2009 | Amidon |
| 2009/0089840 A1 | 4/2009 | Shusman |
| 2009/0167839 A1 | 7/2009 | Ottmar |
| 2009/0205008 A1 | 8/2009 | Wollmershauser et al. |
| 2009/0249223 A1 | 10/2009 | Barsook et al. |
| 2009/0319885 A1 | 12/2009 | Amento et al. |
| 2009/0327428 A1 | 12/2009 | Ramanathan |
| 2010/0066804 A1 | 3/2010 | Shoemake et al. |
| 2010/0111491 A1 | 5/2010 | Kamoto |
| 2010/0153885 A1 | 6/2010 | Yates |
| 2010/0257280 A1 | 10/2010 | Stokking et al. |
| 2010/0281108 A1 | 11/2010 | Cohen |
| 2010/0306671 A1 | 12/2010 | Mattingly et al. |
| 2011/0016172 A1 | 1/2011 | Shah |
| 2011/0069940 A1 | 3/2011 | Shimy et al. |
| 2011/0154417 A1 | 6/2011 | Civanlar et al. |
| 2011/0219307 A1 | 9/2011 | Mate |
| 2011/0246908 A1 | 10/2011 | Akram |
| 2012/0131110 A1 | 5/2012 | Buyukkoc et al. |
| 2012/0151345 A1 | 6/2012 | McClements, IV |
| 2012/0216300 A1 | 8/2012 | Vivolo et al. |
| 2012/0218262 A1 | 8/2012 | Yomdin et al. |
| 2012/0246679 A1 | 9/2012 | Chen |
| 2012/0296972 A1 | 11/2012 | Backer |
| 2013/0016955 A1 | 1/2013 | Pejaver |
| 2013/0031192 A1 | 1/2013 | Caspi |
| 2013/0058632 A1 | 3/2013 | Jackson |
| 2013/0103814 A1 | 4/2013 | Carrasco et al. |
| 2013/0170818 A1 | 7/2013 | Klappert et al. |
| 2013/0173765 A1 | 7/2013 | Korbecki |
| 2014/0068692 A1 | 3/2014 | Archibong et al. |
| 2014/0071344 A1 | 3/2014 | Francisco |
| 2014/0096167 A1 | 4/2014 | Lang et al. |
| 2014/0150002 A1 | 5/2014 | Hough et al. |
| 2014/0195675 A1 | 7/2014 | Silver |
| 2014/0205261 A1 | 7/2014 | Courtemanche |
| 2014/0269757 A1 | 9/2014 | Park et al. |
| 2014/0325557 A1 | 10/2014 | Evans et al. |
| 2015/0037777 A1 | 2/2015 | Kushner |
| 2015/0052571 A1 | 2/2015 | Stokking et al. |
| 2015/0106360 A1 | 4/2015 | Cao |
| 2015/0110471 A1 | 4/2015 | Zheng |
| 2015/0172338 A1 | 6/2015 | Moran et al. |
| 2015/0215352 A1 | 7/2015 | Wong et al. |
| 2015/0230004 A1 | 8/2015 | VanDuyn et al. |
| 2015/0245106 A1 | 8/2015 | Tian |
| 2015/0327024 A1 | 11/2015 | Yang et al. |
| 2016/0006981 A1 | 1/2016 | Bauman et al. |
| 2016/0021153 A1 | 1/2016 | Hull et al. |
| 2016/0044622 A1 | 2/2016 | Crowe et al. |
| 2016/0050160 A1 | 2/2016 | Li et al. |
| 2016/0182928 A1 | 6/2016 | Francisco |
| 2016/0241652 A1 | 8/2016 | Frazier et al. |
| 2016/0255041 A1 | 9/2016 | Lew |
| 2016/0294894 A1 | 10/2016 | Miller |
| 2016/0366203 A1 | 12/2016 | Blong et al. |
| 2017/0006322 A1 | 1/2017 | Dury et al. |
| 2017/0093769 A1 | 3/2017 | Lind et al. |
| 2017/0103664 A1 | 4/2017 | Wong et al. |
| 2017/0163411 A1 | 6/2017 | Van Den Berghe |
| 2017/0264920 A1 | 9/2017 | Mickelsen |
| 2017/0312626 A1 | 11/2017 | Colenbrander |
| 2017/0346926 A1 | 11/2017 | Charters et al. |
| 2018/0035136 A1 | 2/2018 | Crowe |
| 2018/0167427 A1 | 6/2018 | Kedenburg, III |
| 2018/0192000 A1 | 7/2018 | Mercredi et al. |
| 2018/0279007 A1 | 9/2018 | Peterson et al. |
| 2018/0288467 A1 | 10/2018 | Holmberg et al. |
| 2018/0316939 A1 | 11/2018 | Todd |
| 2018/0330756 A1 | 11/2018 | MacDonald |
| 2018/0365232 A1 | 12/2018 | Lewis |
| 2019/0124159 A1 | 4/2019 | Alsina et al. |

(56) References Cited

U.S. PATENT DOCUMENTS

| | | | |
|---|---|---|---|
| 2019/0147841 A1 | 5/2019 | Zatepyakin et al. | |
| 2019/0155934 A1 | 5/2019 | Delaney et al. | |
| 2019/0179610 A1 | 6/2019 | Aiken | |
| 2019/0200054 A1 | 6/2019 | Dharmaji | |
| 2019/0253742 A1 | 8/2019 | Garten et al. | |
| 2019/0303874 A1 | 10/2019 | Yang et al. | |
| 2019/0321720 A1* | 10/2019 | Nomura | A63F 13/87 |
| 2020/0029117 A1* | 1/2020 | Kalva | H04N 21/8456 |
| 2020/0053312 A1 | 2/2020 | Mukherjee et al. | |
| 2020/0112753 A1 | 4/2020 | Stockhammer et al. | |
| 2020/0275149 A1 | 8/2020 | Su et al. | |
| 2020/0402541 A1* | 12/2020 | Talbot | G11B 27/036 |
| 2021/0001236 A1 | 1/2021 | Srinivasan | |
| 2021/0006864 A1 | 1/2021 | Xu et al. | |
| 2021/0035559 A1 | 2/2021 | Xu | |
| 2021/0037295 A1 | 2/2021 | Strickland | |
| 2021/0051034 A1 | 2/2021 | Jonas et al. | |
| 2021/0321159 A1 | 10/2021 | Aggarwal et al. | |
| 2022/0029825 A1 | 1/2022 | Uhr et al. | |
| 2022/0040816 A1 | 2/2022 | Eckel et al. | |
| 2022/0066621 A1 | 3/2022 | Appelbaum et al. | |
| 2022/0103873 A1 | 3/2022 | Yoshida et al. | |
| 2022/0132214 A1 | 4/2022 | Felman | |
| 2022/0139383 A1 | 5/2022 | Rose et al. | |
| 2022/0141500 A1 | 5/2022 | Du | |
| 2022/0166815 A1 | 5/2022 | Gratton et al. | |
| 2022/0174357 A1 | 6/2022 | Zavesky et al. | |
| 2022/0224659 A1 | 7/2022 | Ghazzal | |
| 2022/0248080 A1 | 8/2022 | Strickland | |
| 2022/0256231 A1 | 8/2022 | Eniwumide | |
| 2022/0311725 A1 | 9/2022 | Madduluri et al. | |
| 2022/0377413 A1 | 11/2022 | Lidaka et al. | |
| 2022/0394328 A1 | 12/2022 | Marten | |
| 2022/0408161 A1 | 12/2022 | Garten | |
| 2023/0007342 A1 | 1/2023 | Shah et al. | |
| 2023/0014831 A1 | 1/2023 | Marten | |
| 2023/0145338 A1 | 5/2023 | Iyer et al. | |
| 2023/0147705 A1 | 5/2023 | Huertas et al. | |
| 2023/0179822 A1 | 6/2023 | Marten et al. | |
| 2023/0179823 A1 | 6/2023 | Marten et al. | |
| 2023/0179825 A1 | 6/2023 | Drennan et al. | |
| 2023/0247067 A1 | 8/2023 | Adams et al. | |
| 2023/0362461 A1 | 11/2023 | Marten | |
| 2024/0040178 A1 | 2/2024 | Marten | |
| 2024/0064355 A1 | 2/2024 | Marten | |
| 2024/0064356 A1 | 2/2024 | Marten | |
| 2024/0291791 A1 | 8/2024 | Madduluri et al. | |

OTHER PUBLICATIONS

ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
PCT/IB2021/057835, Invitation to pay Additional Fees and Preliminary International Search Results.
U.S. Appl. No. 16/706,764, Non-Final Office Action Response, Sep. 7, 2021.
U.S. Appl. No. 16/706,764, Notice of Allowance, Mar. 17, 2022.
U.S. Appl. No. 17/087,815, Response to Non-Final Office Action, May 23, 2022.
U.S. Appl. No. 17/376,459, Final Office Action, May 2, 2022.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
U.S. Appl. No. 16/706,686, filed Dec. 7, 2019.
U.S. Appl. No. 16/706,686, Non-Final Office Action, Mailed May 12, 2021.
U.S. Appl. No. 16/706,764, Non-Final Office Action, Jun. 10, 2021.
U.S. Appl. No. 16/801,277, filed Feb. 26, 2020.
U.S. Appl. No. 17/087,815, Non-Final Office Action, dated Feb. 24, 2022.
U.S. Appl. No. 17/376,459, Response to Non-final Office Action, dated Mar. 5, 2022.
PCT/IB2021/057835, Int'l Search Report and Written Opinion, Jan. 27, 2022.
U.S. Appl. No. 17/376,459, Non-Final Office Action, mailed Dec. 17, 2021.
U.S. Appl. No. 15/788,058, Prosecution History through Jul. 19, 2022.
U.S. Appl. No. 16/706,686, filed Dec. 7, 2019, prosecution history.
U.S. Appl. No. 16/706,764, Issue Fee Paid, Jun. 15, 2022.
U.S. Appl. No. 16/706,764, RCE, Jul. 19, 2022.
U.S. Appl. No. 17/376,459, RCE and Response to Final Office Action, Jul. 5, 2022.
U.S. Appl. No. 16/706,764, filed Dec. 8, 2019.
U.S. Appl. No. 17/087,815, filed Nov. 3, 2020.
U.S. Appl. No. 17/376,459, filed Jul. 15, 2021.
U.S. Appl. No. 15/788,058, filed Oct. 19, 2017.
U.S. Appl. No. 15/788,058, Ntc Appeal with Pre-Appeal Brief Conference Request, Sep. 7, 2022.
U.S. Appl. No. 16/706,764, Ntc Allowance, Sep. 8, 2022.
U.S. Appl. No. 16/801,277, Non-Final Office Action, Aug. 30, 2022.
U.S. Appl. No. 17/087,815, Notice of Allowability Sep. 9, 2022.
U.S. Appl. No. 17/087,815, Notice of Allowance Sep. 1, 2022.
U.S. Appl. No. 17/376,459, Non-final Office Action, Jul. 29, 2022.
U.S. Appl. No. 15/788,058, Request for Continued Examination, Amendment and IDS, Nov. 3, 2022.
U.S. Appl. No. 15/788,058, Notice of Allowance Nov. 30, 2022.
U.S. Appl. No. 16/801,277, Response to non-final Office Action, Nov. 28, 2022.
U.S. Appl. No. 17/376,459, Final Office Action, Dec. 1, 2022.
U.S. Appl. No. 17/376,459, Response to Non-final Office Action, Oct. 11, 2022.
U.S. Appl. No. 17/543,852, Non-Final Office Action, Dec. 5, 2022.
M. 0. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 16/801,277, Final Office Action, Dec. 23, 2022.
U.S. Appl. No. 17/543,886, Non-Final Office Action, Dec. 19, 2022.
U.S. Appl. No. 16/801,277, Notice of Allowance & Interview Summary, Jul. 12, 2023.
U.S. Appl. No. 16/801,277, Supplemental Amendment & Interview Summary, Jun. 27, 2023.
U.S. Appl. No. 17/543,925, Final Office Action, Jul. 7, 2023.
U.S. Appl. No. 17/543,925, Response to Final Office Action and eTerminal Disclaimer, Jul. 8, 2023.
U.S. Appl. No. 18/222,453, Continuation application as filed, Jul. 16, 2023.
U.S. Appl. No. 16/706,764, Notice of Allowability, May 11, 2023.
U.S. Appl. No. 17/376,459, Notice of Allowance, Apr. 24, 2023.
U.S. Appl. No. 17/543,886, Response to Non-Final Office Action, Apr. 5, 2023.
U.S. Appl. No. 17/543,852, Final Office Action, May 26, 2022.
U.S. Appl. No. 17/543,886, Final Office Action, May 25, 2023.
U.S. Appl. No. 17/543,925, Non-final Office Action Response, May 29, 2023.
U.S. Appl. No. 17/891,939, Examiner Interview Summary, Jun. 8, 2023.
U.S. Appl. No. 17/891,939, Amendment and Examiner Initiated Interview Summary, May 31, 2023.
U.S. Appl. No. 17/891,939, Notice of Allowance, Jun. 8, 2023.
U.S. Appl. No. 18/094,369, Non-Final Office Action, Jun. 8, 2023.
U.S. Appl. No. 18/094,369, Final Office Action, Nov. 29, 2023 (Available at Patent Center).

(56) References Cited

OTHER PUBLICATIONS

U.S. Appl. No. 18/314,987, Applicant Initiated Interview Summary, dated Nov. 17, 2023, (Available at Patent Center).
U.S. Appl. No. 17/543,925.
U.S. Appl. No. 17/543,852, RCE and Response to Non-Final Office Action, Aug. 22, 2023.
U.S. Appl. No. 17/543,886, RCE and Response to Final Office Action, Aug. 21, 2023.
U.S. Appl. No. 17/543,925, Notice of Allowance and Examiner Interview Summary, Jul. 27, 2023.
U.S. Appl. No. 18/094,369, Response to non-final Office Action with Terminal Disclaimer, Aug. 22, 2023.
U.S. Appl. No. 18/363,897, Application as filed Aug. 2, 2023.
U.S. Appl. No. 17/543,852, Notice of Allowance, Sep. 8, 2023.
U.S. Appl. No. 17/543,886, non-final Office Action, Sep. 14, 2023.
U.S. Appl. No. 18/314,987, Non-Final Office Action, Sep. 13, 2023.
U.S. Appl. No. 18/484,241, filed Oct. 10, 2023 (Available via Patent Center).
U.S. Appl. No. 18/222,453, Notice of Publication, Nov. 9, 2023 (Available at USPTO Patent Center).
U.S. Appl. No. 17/543,886, Response to non-final Office Action, Jan. 5, 2024 (Available at USPTO Patent Center).
U.S. Appl. No. 17/840,966, Response to non-final Office Action, Jan. 5, 2024 (Available at USPTO Patent Center).
U.S. Appl. No. 18/314,987, Response to Non-Final Ofice Action, dated Dec. 13, 2023, (Available at Patent Center).
U.S. Appl. No. 17/840,966, Non-Final Office Action, Oct. 19, 2023 (Available via USPTO Patent Center).
U.S. Appl. No. 16/801,227, filed Feb. 26, 2020.
U.S. Appl. No. 17/840,966, filed Jun. 15, 2022.
U.S. Appl. No. 18/094,369, filed Jan. 8, 2023.
U.S. Appl. No. 17/543,852, filed Dec. 7, 2021.
U.S. Appl. No. 17/543,925, filed Dec. 7, 2021.
U.S. Appl. No. 17/891,939.
U.S. Appl. No. 18/363,897.
U.S. Appl. No. 18/314,987.
U.S. Appl. No. 18/484,241 Non-Final Office Action, May 20, 2024 (Available at USPTO Patent Center).
U.S. Appl. No. 18/657,624, filed May 7, 2024 (Available at USPTO Patent Center).
U.S. Appl. No. 17/891,939, filed Aug. 19, 2022.
U.S. Appl. No. 18/314,987, Notice of Allowance, dated Feb. 27, 2024, (Available at Patent Center).
U.S. Appl. No. 16/706,764, Prosecution Reopened, Jan. 4, 2023.
U.S. Appl. No. 16/801,277, RCE and response to Final Office Action, Mar. 21, 2023.
U.S. Appl. No. 17/376,459, Response to Final Office Action, Mar. 29, 2023.
U.S. Appl. No. 17/543,852, Response to Non-Final Office Action, Apr. 3, 2023.
U.S. Appl. No. 17/543,925, Non-final Office Action, Jan. 31, 2023.
U.S. Appl. No. 17/543,886, Final Office Action, Feb. 15, 2024 (Available at USPTO Patent Center).
U.S. Appl. No. 18/094,369, Notice of Allowance, Feb. 14, 2024 (Available at USPTO Patent Center).
U.S. Appl. No. 18/094,369, Response to Final Office Action, Jan. 27, 2024 (Available at USPTO Patent Center).
U.S. Appl. No. 18/484,241, Notice of Publication, Feb. 2, 2024 (Available at USPTO Patent Center).
U.S. Appl. No. 18/484,241, Response to Non-Final Office Action, Aug. 15, 2024 (Available at USPTO Patent Center).
U.S. Appl. No. 18/657,624, Application as published, Aug. 29, 2024 (Available at USPTO Patent Center).
U.S. Appl. No. 18/363,897, Non-Final Office Action, Aug. 8, 2024 (Available at USPTO Patent Center).
U.S. Appl. No. 18/222,453, Non-final Office Action Response and Terminal Disclaimer, Dec. 3, 2024 (Available at USPTO Patent Center).
U.S. Appl. No. 18/222,453, Non-final Office Action, Nov. 19, 2024 (Available at USPTO Patent Center).
U.S. Appl. No. 18/484,241, Terminal Disclaimer, Nov. 20, 2024 (Available at USPTO Patent Center).
U.S. Appl. No. 18/484,241, Notice of Allowance, Examiner Interview Summary and OA Appendix, Dec. 10, 2024 (Available at USPTO Patent Center).
U.S. Appl. No. 18/484,241, filed Oct. 10, 2023.
U.S. Appl. No. 17/336,416, filed Jun. 2, 2021.
U.S. Appl. No. 17/543,886, filed Dec. 7, 2021.
U.S. Appl. No. 18/363,897, filed Aug. 2, 2023.
U.S. Appl. No. 18/314,987, filed May 10, 2023.
U.S. Appl. No. 18/657,624, filed May 7, 2024.
U.S. Appl. No. 18/222,453, Notice of Allowance, Jan. 15, 2025 (Available at USPTO Patent Center).
U.S. Appl. No. 17/336,416, Notice of Allowance and Examiner Interview Summary, Feb. 20, 2025 (Available at USPTO Patent Center).
U.S. Appl. No. 18/363,897, Notice of Abandonment, Feb. 14, 2025 (Available at USPTO Patent Center).
U.S. Appl. No. 19/065,276, Application filed, Feb. 27, 2025 (Available at USPTO Patent Center).
U.S. Appl. No. 18/222,453, filed Jul. 16, 2023.
U.S. Appl. No. 18/672,409, filed May 23, 2024.
U.S. Appl. No. 19/065,276, filed Feb. 27, 2025.
U.S. Appl. No. 19/178,031, Application as filed, Apr. 14, 2025 (Available at USPTO Patent Center).

* cited by examiner

CONSOLIDATED WATCH PARTIES

CROSS-REFERENCE TO RELATED APPLICATIONS

This application is related to co-pending U.S. patent application Ser. No. 16/801,277, filed on 26 Feb. 2020, in the name of inventor Neil Marten, and entitled "Devices, Systems and Processes for Facilitating Watch Parties" (the "'277 Application"). The entire contents of the '277 Application are incorporated herein by reference.

TECHNICAL FIELD

The technology described herein generally relates to devices, systems, and processes for facilitating consolidated watch parties and interactive consolidated watch parties.

BACKGROUND

Various devices, systems and processes today enable a person to be presented with content, such as a football game, television show, video game, soundtrack, or the like using a presentation device. Such content may be presented to a user in a humanly perceptible format, such as visually, audibly, as vibrations, combinations of the foregoing, or otherwise. Often a first user desires to be presented with such content at substantially the same time as another, second user. The second user may be physically located remotely to the first user, such as in another building, city, state, country or otherwise. The first user and the second user may desire to receive such content and, together participate in the reception of such content, include the sharing of their reactions to such content with others at substantially the same time as the content is presented to the users.

A participant in a watch party may desire to later review one or more content segments and/or "chat data" (as described in the '277 Application) after a given watch party or a collection of watch parties have occurred, while avoiding a review or scrolling through of one or more portions of the watch party to find segments of interest therein. Further, approaches are needed for identifying segments of interest in watch parties. The various embodiments of the present disclosure address these and other needs.

SUMMARY

Various implementations are described of devices, systems, and processes for facilitating "consolidated watch parties."

In accordance with at least one implementation of the present disclosure a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a sync server and a first user device communicatively coupled to the sync server. The sync server executes computer instructions instantiating a consolidation engine operable to assemble a watch party reel that includes a content segment and a prior reaction to the content segment. The watch party reel is output by the server to the first user device for presentation to a first user. Other embodiments of this aspect include corresponding computer systems, apparatus, and computer programs recorded on one or more computer storage devices, each configured to perform the actions of the system.

Implementations may include one or more of the following features. The consolidated watch party system may include a content segment including a portion of a content presented during a watch party. A prior reaction may include chat data captured, during the watch party, by a watch party user device. The prior reaction may include a user reaction to the content. The prior reaction may include a facial response to the content. The prior reaction may include an audible response to the content.

The consolidation engine may be operable to select the content segment, from a collection of content segments, based upon a first tag associated with the content segment. The first tag may be generated by a content source which provided the content segment during the watch party. The consolidation engine may be operable to select the prior reaction, from a collection of prior reactions, based upon a second tag associated with the prior reaction. The first tag and the second tag may correspond to a matter designation. The matter designation may correspond to a criteria that includes at least one of: most popular, funniest, most viewed, highest rated, best of, scariest, informative, fact verified, and source verified. The consolidation engine may be operable to analyze chat data received previously from at least one of a first watch party user device and a second watch party user device during a prior watch party. The consolidation engine may tag the chat data according to a matter designation. The chat data may include at least one of: a facial response of a first user of the first watch party user device to the content segment and an audible response of the first user to the content segment. The watch party reel further may include a second content segment and a second prior reaction to the second content segment. Implementations of the described techniques may include hardware, a method or process, or computer software on a computer-accessible medium.

One general aspect includes a server that may include a sync server operable to execute computer instructions instantiating one or more computer engines and/or combinations thereof. The computer engines may include a consolidation engine operable to assemble a watch party reel that includes a content segment and a prior reaction to the content segment. The computer engines may include a sync engine operable to adjust a first bit rate for the watch party reel to generate an adjusted first watch party reel, output the adjusted watch party reel to a first user device, and output the watch party reel to a second user device substantially simultaneously with the outputting of the adjusted watch party reel to the first user device. The computer engines may also include a chat engine operable to receive a later reaction, to at least one of the content segment and the prior reaction, from at least one of the first user device and the second user device. Other embodiments of this aspect may include corresponding computer systems, apparatus, and computer programs recorded on one or more computer storage devices, each configured to perform the actions of the methods.

Implementations may include one or more of the following features. The content segment may include a portion of a content presented during a prior watch party. The prior reaction may include chat data captured during the prior watch party. The chat data may include at least one of a facial response and an audible response to the content. The later reaction may include chat data captured during a presentation of at least one of the adjusted watch party reel and the watch party reel. The chat data may include at least one of a facial response and an audible response to at least one of the content segment and the prior reaction.

The consolidation engine may be further configured to select the content segment, from a collection of two or more content segments based upon a first tag associated with the content segment. The first tag may be generated by a content source which provided the content segment during at least one of a prior watch party and an interactive consolidated watch party. The consolidation engine may be further configured to analyze chat data received previously from at least one of a first watch party user device and a second watch party user device during the prior watch party or the interactive consolidated watch party and tag the chat data according to a matter designation. The consolidation engine may further identify the chat data as the prior reaction and select the prior reaction, from a collection of prior reactions, based upon the tag associated with the prior reaction. The chat data may include at least one of: a facial response of a first user of the first watch party user device to the content segment and an audible response of the first user to the content segment. Implementations of the described techniques may include hardware, a method or process, or computer software on a computer-accessible medium.

One general aspect includes a method for facilitating consolidated watch parties. The method may include forming a watch party reel including a content segment and a prior reaction selected from a previously occurring watch party. The content segment may be tagged by a content source as corresponding to a matter designation. The prior reaction may be tagged by a server as corresponding to the matter designation. The method may include outputting the watch party reel to a user device for presentation to a user. Other embodiments of this aspect include corresponding computer systems, apparatus, and computer programs recorded on one or more computer storage devices, each configured to perform the actions of the methods.

BRIEF DESCRIPTION OF THE DRAWINGS

The features, aspects, advantages, functions, modules, and components of the devices, systems and processes provided by the various implementations of embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
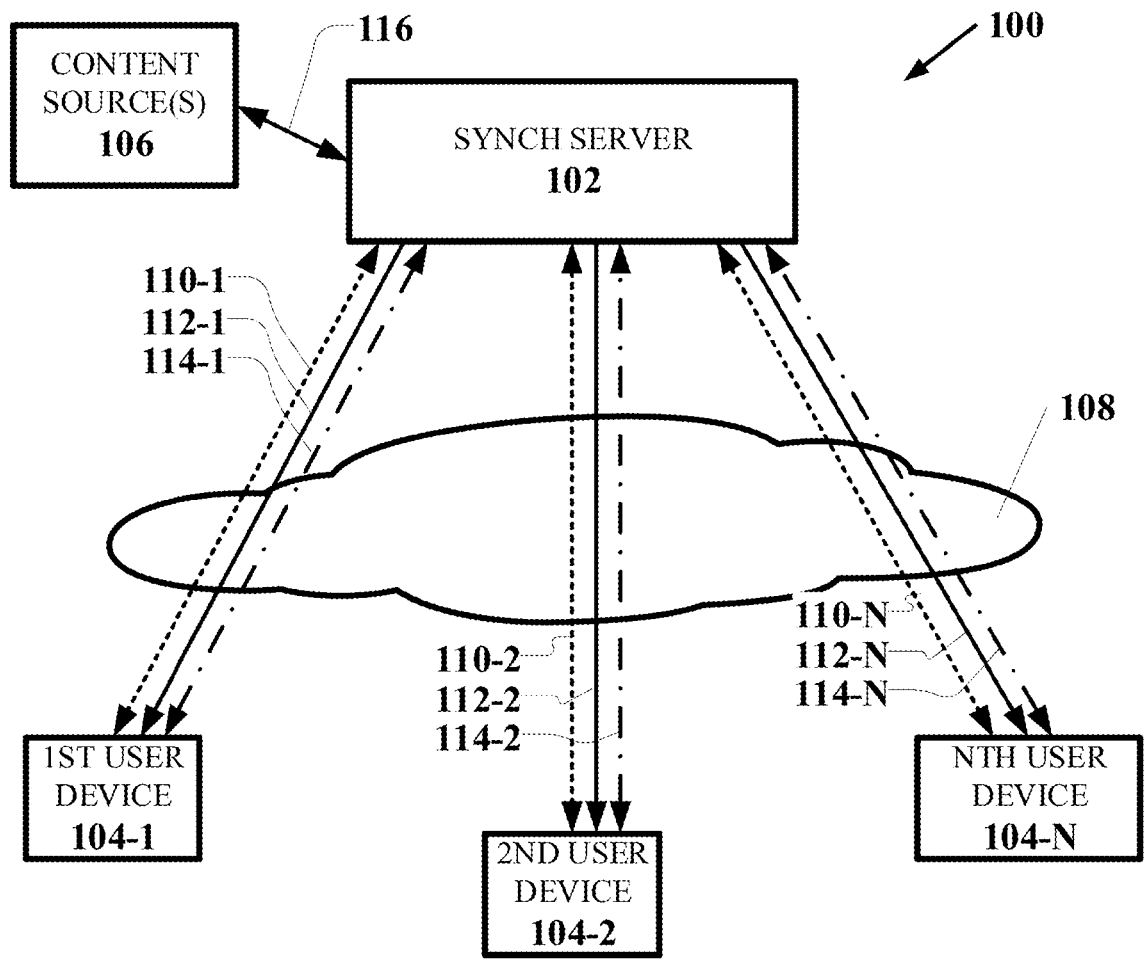
FIG. 1 is a schematic illustration of a system for facilitating consolidated watch parties and in accordance with at least one implementation of the present disclosure.

Various implementations of the present disclosure describe devices, systems, and processes for utilizing chat data and content (as defined below) presented during a watch party to facilitate a later arising consolidated watch party.

As described in the '277 Application and herein, a "watch party" is a "substantially simultaneous" (as defined below) and "separate" (as defined below) presentation of "content" (as defined below), and one or more user "reactions" (as described below) to such content and/or to other user reactions, to two or more users.

"Substantially simultaneous" means without incurring a humanly perceptible delay between a presentation of one or more of the content and a reaction to such content by a given user, to two or more other users during a watch party or otherwise.

"Separate" when referring to two or more users participating in a watch party, means a first user may be physically or virtually separated from one or more second users such that users are uniquely presented the content in a format perceptible by such user. Such separation may occur geographically, wherein a first user is in a different room, building, city, state, or country than one or more second users. The separation may occur virtually, such as when a first user perceives the content and/or reaction(s) as presented in a first format (such as an audible portion of the football game in a first language), while a second user perceives the content and/or reactions in a second format (such as the audible portion of the football game being provided in a second language). Separations may occur geographically and/or virtually.

"Content" refers to any humanly perceptible information, such as video, television programs, audio programs, speeches, concerts, gaming, or otherwise. The content may originate from any source, including live, augmented reality, virtual reality, computer generated, or otherwise. The content may be presented to a given user using any user device (as described below). The content may be presented during a watch party to one or more users "real-time" (which is defined herein to mean as the underlying action provided in such content first occurs in time), on a recorded, time delayed, time shifted, or any other basis.

During a "consolidated watch party" and/or "an interactive consolidated watch party", "matter" may refer to one or more "content segments", "additional content", "prior reactions", and "later reactions: (as such terms are described below).

A "content segment" is a portion of content previously presented during a watch party and later presented during a consolidated watch party and/or during an interactive consolidated watch party (as described below). For a non-limiting example, "content" for a watch party may have included audio and video for an entire football game. A "content segment" may include just the audio and video of a scoring drive for the football game. A consolidated watch party may include a selection of one or more content segments and one or more prior reactions to the selected one or more content segments.

"Additional content" is content not previously presented during a watch party that is presented during an interactive consolidated watch party.

A "reaction" is a response by a user to given "matter". A reaction may be internal, for example, an elevated heart rate, and/or publicly manifested, for example, an outburst of sounds, motion (e.g., hand waving), or otherwise. A reaction may be ephemeral, ongoing, or otherwise. For example, a cheering by a first user, during a watch party, in response to a goal scored in a football game may be separately presented, during a watch party, to a second user at substantially the same time that the first user reacted to their viewing of the scoring of the goal. In essence, during a watch party, the second user is presented with the first user's reaction as if they were physically present in a same room and viewing the football game together. A reaction captured during a previously occurring watch part is herein identified as a "prior reaction". A reaction captured during an interactive consolidated watch party (as described below) is herein identified as a "later reaction", for example, a then arising "reaction" by a user to a presentation of additional content, content segments(s), and/or prior reaction(s).

As further described in the '277 Application, during a watch party, a sync server may be configured to transmit a given content, e.g., a motion picture, as a first content to the first user device and as a second content to the second user device. The sync server may be configured to adjust a first bit rate for the first content. Upon adjusting the first bit rate, the first content and second content may be respectively provided to the first user device and the second user device such that the first user device and the second user device can substantially simultaneously and separately present the first content to the first user and the second content to the second user. Reactions by the first user and/or the second user may be captured by a user's respective user device and communicated, via the sync server, to other users participating in a given watch party substantially simultaneously with the presentation of the content to such users. Such reactions may be captured by a user device and communicated to a sync server, during a given watch party as "chat data" (as further described in the '277 Application and below). Such chat data may be suitably stored by the sync server in a data storage for later use in facilitating consolidated watch parties, as per an implementation of the present disclosure.

As used with respect to at least one implementation, a "consolidated watch party" ("CWP") is a collection of one or more of "matters" that occurred during a previously presented watch party. A CWP may include the non-real-time presentation of content segments presented during a given watch party and prior reactions.

A reference to "Cloud" includes references to cloud computing, cloud storage, cloud communications, and/or other technology resources which a user may not actively manage the providing or use of such resources. A use of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide for data processing, storage and other functions.

An "interactive consolidated watch party" ("ICWP") is a CWP that may further include capturing of any "later reactions" and/or additional content. Later reactions may be captured and shared, at any time, between two or more users and communicated as "chat data." For example, during an ICWP of the football scoring driver, a user viewing a content segment and/or prior reactions thereto may then react (thereby providing a "later reaction"), such as by identifying a penalty, an out-of-bounds play, or otherwise. Such later reaction may likewise occur in response to another prior reaction, later reaction, additional content (e.g., a different camera angle) or otherwise. An ICWP may include capturing of later reactions and communication thereof to other users substantially simultaneously, or at a later time.

Herein, consolidated watch parties (CWPs) and interactive consolidated watch (ICWPs) are identified, collectively as being an "(interactive) consolidated watch party" ("(I) CWP").

For at least one implementation, multiple iterations of ICWPs may be generated, wherein a given iteration may include any corresponding "matter". As further viewing of an ICWP occurs, $n^{th}$ iterations of such ICWPs may be generated. For at least one implementation, an ICWP may include an ever-expanding collection of user later reactions to "matter" presented during the ICWP.

For an implementation of an ICWP, a given watch party may be on-going. As such, an ICWP may arise during a playback or presentation of any "matter".

As shown in FIG. 1, one implementation of a system for facilitating (I)CWPs may include a synchronization ("sync") server 102 that is communicatively coupled by a communications network 108 to a first user device 104-1, multiple user devices 104-2 to 104-N may also be coupled to the sync server.

A content source 106 may be coupled to the sync server 102 when local copies of content segments are not maintained by the sync server 102. The sync server 102, user devices 104-1 to 104-N, and content source(s) 106 may be the same or different than those used during one or more watch parties from which the given (I)CWP is generated. For at least one implementation, an (I)CWP may generated from "matter" presented during two or more prior watch parties. For example, an (I)CWP of a user's favorite football team may include "matter" taken from two or more football games during a given season.

For at least one implementation, a CWP may be generated as providing, in essence, a "highlights reel" of a given season that includes curated and/or selected "matter" from a larger collection thereof. An ICWP may include as such "matter" later reactions, when a CWP is presented to two or more users substantially simultaneously and separately, with such later reactions being captured by respective user devices, communicated to the sync server 102, and to other user devices 104 as chat data.

The system components of the implementation of FIG. 1 are further described below with reference to FIG. 1 and FIG. 2.

Sync Server 102

Figure 2:
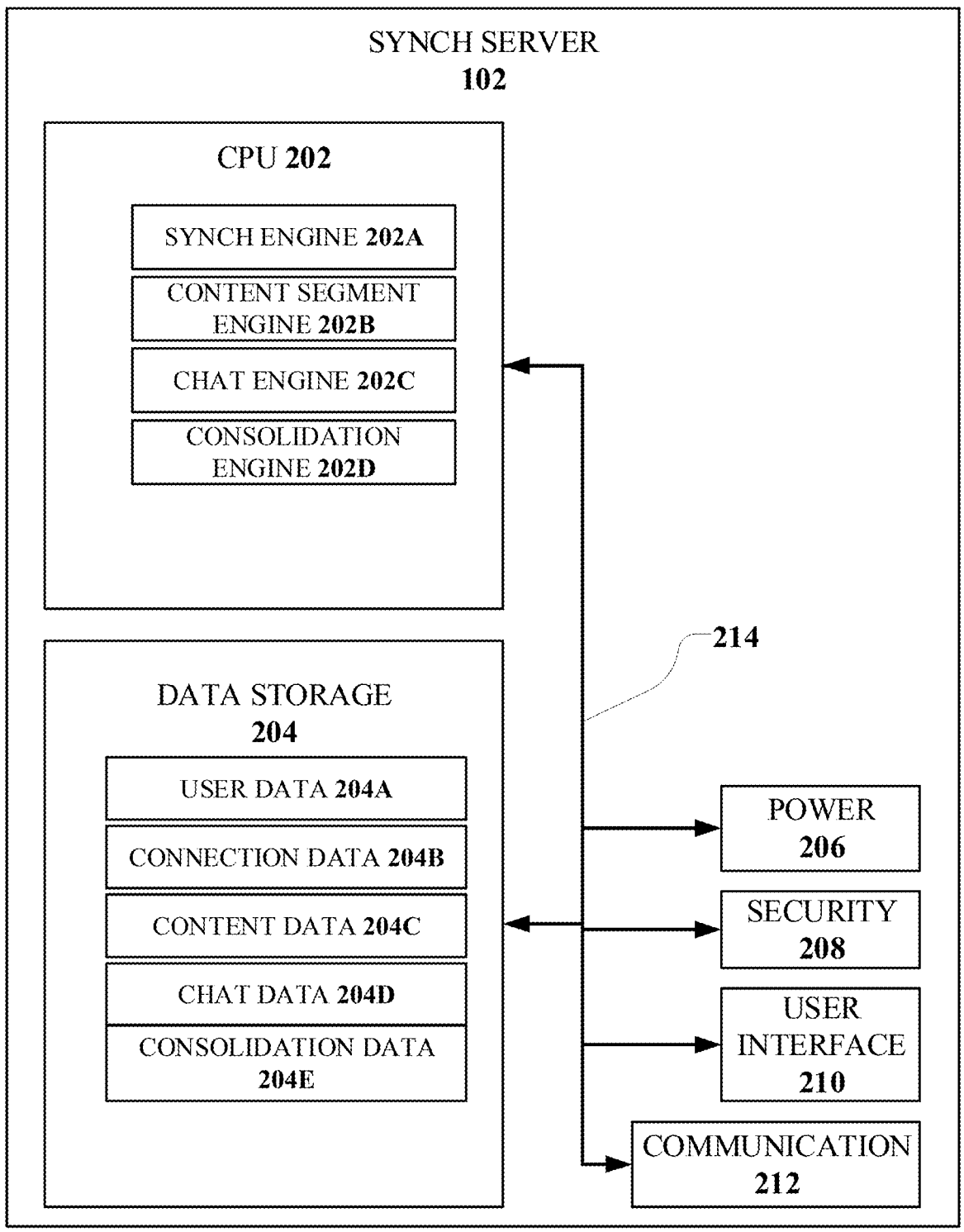
FIG. 2 is a schematic illustration of a synchronization server for use in facilitating consolidated watch parties and in accordance with at least one implementation of the present disclosure.

As shown in FIG. 2, the sync server 102 may include and/or be communicatively coupled to a central processing unit (CPU) 202. The CPU 202 may be provided by any local processing device capable of executing one more computer executable instructions (herein, a "computer instruction") which, in accordance with an implementation of the present disclosure, facilitate one or more data processing operations including, and not limited to, one or more computer engines such as a sync engine 202A, a content segment engine 202B, a chat engine 202C, and a consolidation engine 202D (such computer engines are further described below). One or more of the computer engines 202-A/B/C/D/E may be combined and/or provided separately. One or more of the computer engines 202-A/B/C/D/E may be utilized or not utilized for a given CWP and/or for a given ICWP. For a non-limiting example, the chat engine 202B may not be configured for use during a CWP and may be configured for use during an ICWP.

The CPU 202 may include one or more physical (as compared to logical) components configured for such data processing operations. The CPU 202 may include one or more hardware processors, such as 32-bit and 64-bit central processing units, multi-core ARM based processors, microprocessors, microcontrollers, and otherwise. The computer instructions may include instructions for executing one or more applications, software computer engines, and/or processes configured to perform computer executable operations. Such hardware and computer instructions may arise in any computing configuration including, and not limited to, local, remote, distributed, blade, virtual, or other configurations and/or systems configured for use in support of an implementation of one or more embodiments of the present disclosure.

The CPU 202 may be communicatively coupled by a data bus 214 or similar structure to a data storage 204, which may also be referred to as a "computer readable storage medium." The data storage 204 may be a single storage device, multiple storage devices, or otherwise. The data storage 204 may be provided locally with the sync server 102 or remotely, such as a data storage service provided on the Cloud, and/or otherwise. Storage of data including, and not limited to, user data 204A, connection data 204B, content data 204C, chat data 204D, consolidation data 204E, and other data may be managed by a storage controller (not shown) or similar component.

It is to be appreciated that a storage controller manages the storing of data and may be instantiated in one or more of the data storage 204, the CPU 202, on the Cloud, or otherwise. Any known or later arising storage technologies may be utilized. Non-limiting examples of devices that may be configured for use as data storage 204 include electrical storage devices, such as EEPROMs, random access memory (RAM), Flash drives, and solid-state drives, optical drives such as DVDs and CDs, magnetic storage devices, such as hard drive discs, magnetic drives, magnetic tapes, memory cards, such as Compact Flash (CF), Secure Digital (SD) cards, USB cards, and others.

Available storage provided by the data storage 204 may be partitioned or otherwise designated by the storage controller as providing for permanent storage and temporary storage. Non-transient data, transient data, computer instructions, or the like may be suitably stored in the data storage 204 for any amount of time used to execute one or more computer instructions. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store either transiently and non-transiently computer instructions and other data.

The sync server 102 may be any computing device capable of facilitating one or more of the operations described below and/or otherwise provided by an implementation of the present disclosure.

The sync server 102 may be further configured to include a power supply 206. The power supply 206 may include any known or later arising technologies which facilitate the storage, supplying, transforming, or other use of electrical energy. Non-limiting examples of such technologies include batteries, power converters, inductive charging components, line-power components, solar power components, and otherwise.

The sync server 102 may be further configured to include a security module 208. The security module 208 may be provided as a hardware security module and/or as a software executed security module. Security modules are well known in the art and may include any known or later arising security hardware and/or software components, including computer instructions, configured to secure content, communications, restrict access to devices, processes, components, and data therewith, and otherwise. Security components may be used to facilitate secure transmission, processing, storage, and otherwise of any data used in accordance with an implementation of the present disclosure.

The sync server 102 may be further configured to include a user interface 210. The user interface module 210 may include any known or later arising human to device interface components, processes and technologies. User interfaces 210 are well-known in the art and non-limiting examples include interfaces facilitating human to device communication of information in any form including include audible inputs (such as spoken commands) and outputs (generated sound), visible inputs (such as eye tracking and facial recognition) and outputs (such as visible images presented on a display device, LEDs, or otherwise), touch inputs (such as on a trackpad, touch screen or otherwise), touch feedback (such as vibrations or other movements), gesture tracking, and otherwise. The user interface module 210 may be coupled to and/or include the one or more presentation devices (not shown). The presentation devices facilitate interactions between the user and the sync server 102. Non-limiting examples of presentation devices include speakers, displays, and others.

The sync server 102 may be further configured to include one or more communications interfaces 212. The communications interfaces 212 may be configured to use any known or later arising communications and/or networking technologies which facilitate use of the communications network 108 (as further described below). Communications interfaces are well-known in the art and non-limiting examples include Ethernet cards, USB and storage medium interface cards, radio frequency transceivers, and the like.

User Device(s) 104

Referring again to FIG. 1 and for at least one implementation of a CWP, the system 100 includes at least one user device, such as first user device 104-1. For an ICWP, one or more additional user devices may be included, such as a second user device 104-2 to an Nth user device 104-N. Such additional user devices may be included in the system 100 at the same time as the first user device 104-1 is initially presented with "matter" or at a later time.

The user devices 104 may be similarly configured to the sync server 102 to include one or more processors, data storage components, user interface components, power supplies, security modules, and communications interfaces. The user devices 104 may also include one or more location components (not shown) that may be useful in determining a then present location for the user device 104. The characteristics and capabilities of such components are well known in the art and one or more of such components may be configured to execute computer instructions which facilitate (I)CWPs. Non-limiting examples of user devices 104 include smartphones, laptop computers, tablet computing devices, desktop computers, smart televisions, smart glasses, virtual reality glasses, augmented reality glasses, earbuds/headphones and other audible output devices, and other devices. User devices 104 may be communicatively coupled to a cable system, satellite system, streaming audio and video system, online gaming system, and/or other content distribution systems, on-line content distribution systems, and the like to facilitate communications with the sync server 102.

Content Sources 106

For at least one implementation, the system 100 may include one or more content sources 106. The content sources 106 may provide some or all of the "matter" presented during an (I)CWP. The content sources 106 may be similarly configured to the sync server 102 to include one or more processors, data storage, user interfaces, security, communications, and location components. The characteristics and capabilities of such components are well known in the art and one or more of such components may be configured to execute computer instructions which facilitate (I)CWPs. Non-limiting examples of content sources 106 include cable and satellite television system, such as those provided by COMCAST and DISH NETWORK, streaming content sources, such as those provided by SLING TV, YOUTUBE, and others, video-on demand sources, such as those provided by NETFLIX, HULU and others, and other sources of content.

For at least one implementation, a content source 106 may be a user device 104, wherein the user device provides additional content, such as live or recorded content, for use during an ICWP. For at least one implementation, a user device 104 may function as a presentation device to a given user during an (I)CWP. During an ICWP, a user device 104 may function as a content source for presentation of additional content and/or later reactions to other users.

For example, a birthday party may be captured by a user's device, such as a smartphone, communicated to the sync server 102 and presented to other users, during a watch party, with reactions by one or more of such users being shared with the other users substantially simultaneously. An (I)CWP may be generated from the watch party and include any given "matter". For the non-limiting birthday party example, a CWP may provide the moment(s) of realization (prior reactions), by a person opening a present, of what the present entails. Such prior reactions, such as joy, puzzlement, or the like, and having been captured during the watch party, may be presented during the (I)CWP.

For at least one implementation, the sync server 102 may be configured to store, for example, as content data 204C, one or more content segments selected from the content presented during a watch party. For another implementation, the sync server 102 may be configured to store, for example as content data 204C, one or more links to content segments selected from the content presented during a watch party, where such one or more links identify a content source 106 and a location of where the given content segment(s) can be retrieved from such content source 106.

Network 108

For at least one implementation, the system 100 includes a communications network 108 that communicatively couples a user device 104 with the sync server 102 and communicatively couples the content source 106 with the sync server 106.

For at least one implementation of an ICWP, user devices 104 may be directly or indirectly coupled. The communications network 108 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise.

The communications network 108 may utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies.

One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

As shown in FIG. 1, one or more communications links may be established between a user device 104 and the sync server 102 during an (I)CWP. It is to be appreciated that any combination of communications links, including the communications links, may be combined or provided as single, multiple or other combinations of communication links. Accordingly, it is to be appreciated that the communications links are described herein for purposes of functional explanation and are not limited to any particular physical configurations.

More specifically, a user device 104 may establish a sync link 110-1/2/N with the sync server 102. For at least one implementation, the sync link 110 may be used to facilitate communication of timing, status and other synchronization information by and between a given user device 104 and a given sync server 102 during an (I)CWP.

As further shown in FIG. 1, a user device 104 may establish a content link 112-1/2/N with the sync server 102. For at least one implementation, the content link 112 may be used to facilitate communication of "matter" by the sync server 102 and/or from a content source 106 to a user device 104 participating in an (I)CWP. While depicted in FIG. 1 as a unidirectional link, it is to be appreciated that when a given user device 104 may also function as a content source for given "matters" to be presented during an ICWP, the content link 112 may be reversed between that given user device functions as a content source and a content recipient for one or more "matter". The content link 112 may be used to present "matters" during an (I)CWP presentation to a given user device.

For at least one implementation of an ICWP, a user device 104 may be configured to be a receiver and a source of a given "matter". For a non-limiting example, a first user device 104-1 may be configured to present additional content, example a video feed of another content not previously presented during a given one or more watch parties, during an ICWP. Likewise, additional content may be obtained from other content sources 106 during an ICWP.

As further shown in FIG. 1, one or more user devices 104 may establish a chat link 114-1/2/N with the sync server 102. For at least one implementation, the chat link 114 may be used to facilitate bi-directional communication of one or more users' reactions to a given content during an ICWP. Reactions captured by a given user device may be shared substantially simultaneously, or at another time, with other users during (or after) a multi-user presentation of an ICWP, appended to the ICWP for presentation to other users as "matter" at another time, or otherwise captured and processed.

For at least one implementations, user later reactions during an ICWP may not be captured as "matter" for later presentation. For another implementation, a given user's later reactions may be captured as "matter" during an ICWP and presented later during a subsequent presentation of an (I)CWP.

Reactions captured by any user device may be shared in any given presentation of an (I)CWP. For at least one implementation, a user's later reactions during a presentation of an ICWP may be communicated to the sync server 102 using the chat link 114 and redistributed to the other users, substantially simultaneously, real-time, or at a later time, using the content link 112. For example, audio and/or video of a user's reaction may be communicated over respective content links 112 to other users in a picture-in-picture, overlay, separate audio channel, mixed audio channel, text message stream, closed captioning stream, or otherwise. It is to be appreciated that such "later reactions" may be communicated using the system 100 in separate data streams, such as separate MPEG, AAC, or other audio and/or video streams.

One or more user devices 104 and/or the sync server 102 may be configured to mix, present or otherwise process later reactions in accordance with preferences of a given user, based upon a default setting, or otherwise. For at least one implementation, one or more of the sync server, a transmitting user device and/or a receiving user device may be configured to transform later reactions provided by a given user into an audible, visual, grammatical, phonetic, language, or other format. For example, audible later reactions in the Spanish language may be translated into the English language. Similarly, audible later reactions may be converted to text for hearing impaired users and physical reactions (such as clapping or the like) may be converted to descriptive text for visually impaired users. Other later reactions may be converted for any given implementation. For at least one implementation, Cloud based resources may be used for later reaction conversions.

For at least one implementation, the sync server 102 may be configured to process and use, in subsequent (I)CWP presentations, later reactions in lieu of and/or in addition to prior reactions. For example, a prior reaction containing profanity may be replaced with a later reaction not containing such profanity. Similarly, an incomplete prior reaction may be augmented by a later reaction expounding thereon.

As further shown in FIG. 1, one or more source links 116 may be established between a content source 106 and the sync server 102 and/or one or more user devices 104. For at least one implementation of an ICWP, the source links 116 facilitate the providing of additional content and/or content segments to a given one or more user devices 104. The additional content and/or content segments may be provided indirectly, for example, by routing such content thru and/or via the sync server 102 and/or one or more streaming servers (not shown) operating under direction and/or control of the sync server 102.

For at least one implementation, one or more direct connections between a content source 106 and a user device 104 may be used. As used herein, a "direct" connection between a content source 106 and a user device 104 does not utilize the sync server 102, or a streaming server operating under the direction and control of the sync server 102, to provide the given "matters" to a given user device 104 for a presentation of an (I)CWP. Also, a hybrid topology may be used where in-direct and direct connections are used between content sources 106, sync server 104, and one or more user devices 104.

Referring again to FIG. 2, the sync server 102 may be configured to manage and process content and reactions for facilitating (I)CWPs by executing computer instructions for the sync engine 202A, content segment engine 202B, chat engine 202C, and a consolidation engine 202D. For an ICWP, the sync server 102 may be further configured to execute computer instructions for a later reaction engine as a sub-component of the chat engine 202C. Such computer engines may also be instantiated and executed on one or more of the user devices 104.

Sync Engine 202A

During a CWP, the sync engine 202A is operable to facilitate the providing of content segments and prior reactions to a given user device. Such synchronization may include the providing of transitions between multiple content segments, such as fading in, fading out, or the like. For at least one implementation, the sync engine 202A may be inoperative for a CWP.

During an ICWP, the sync engine 202A is operable to facilitate synchronization of one or more content segments, additional content, prior reactions, and/or later reactions amongst the various user devices based upon determined communications network delays (herein, "latency"), user device content and/or reaction processing delays (herein, "user device delays"), and other delays to output one or more adjusted watch party reels.

The sync engine 202A may be configured to manage formation of an ICWP, determine latency, user device delays, and other delays, and synchronize the providing of given "matters." For at least one implementation, synchronization may occur based upon one more identifiable portions of one or more of the given "matters", such as a timestamp for a given content segment, a given prior reaction, or a given later reaction. For another implementation, synchronization may be provided at other than on a substantially simultaneous basis.

During an (I)CWP, content segments, and other data may be identified by one or more of an elapsed time, a remaining time, a presentation time stamp, a decoder time stamp, an absolute time (such as a time based on a universal time), a packet number, or packet identifier, or otherwise.

Content Segment Engine 202B

For at least one implementation, the content segment engine 202B may be configured to manage the providing of one or more given "matters" to one or more given user devices 104 during an (I)CWP. For at least one implementation, the sync server 102 may be configured to operate as one or more streaming servers, with a streaming server providing "matters" to the one or more given user devices 104. The content segment engine 202B may be configured to request and receive one or more "matters" from a content source 106. The content segment engine 202B may further be configured to buffer, temporarily store, and/or permanently store such "matter".

For at least one implementation, a content segment engine 202B, whether instantiated on a sync server 102 or a user device 104, may be configured to control one or more aspects of presentation of a given "matter". For example, and not by limitation, one or more trick-play modes may be supported by a content segment engine 202B, non-limiting examples of trick-play modes include: Pause, Play, Skip, Fast Forward, Reverse, Stop, and the like. For at least one implementation, trick-play modes (when supported for a given content segment and/or new content) may be selected by a "director" (as defined below) using an appropriate input/output device, such as a remote-control device, a verbal command, a gesture, or otherwise. For at least one implementation, a contextual voice command, or the like, may be used to initiate presentation of a (I)CWP.

As used herein, a "director" is a user device participating in an (I)CWP. For at least one implementation, the "first user device" and the "director" are used interchangeably. It is to be appreciated that any given user device may be a director. For a CWP, one director is typically designated. For an ICWP, two or more user devices may be designated as being a director.

A director 104-1 may specify to the sync server 102 the content segments to be presented during an (I)CWP. For example, an (I)CWP for a football game may include content segments for Team A and for Team B. A first director may select content segments for Team A for a first (I)CWP, while a second director may select content segment for Team B for a second (I)CWP.

During an ICWP, the content segment engine 202B may be configured such that a given "matter" is communicated to the two or more participating user devices such that latency, user device delays and/or other delays associated with such communication and processing of the "matter" by the user devices are accounted for and such that the presentation of a given "matter" occurs substantially simultaneously across two or more of the user devices then participating in the ICWP.

The content segment engine 202B may be configured such that "matter" communicated to a user device participating in a given ICWP is provided at one or more of a quality setting, a minimum quality setting, a maximum quality setting, or otherwise. When a specified quality setting is not achievable, at a given time, the content segment engine 202B may be configured to take corrective actions until such minimum quality settings can be realized. Non-limiting examples of such corrective actions include: pausing presenting of the "matter" to one or more user devices participating in the ICWP; providing an alternative content link to those user devices not otherwise receiving the "matter" at the minimum quality level; recording the event for later presentation; disabling sharing of later reactions, in one or more formats (such as audio and video), to and/or from one or more user devices; providing an option to a user of a given user device to accept a different quality level; forcing participating user devices (as defined below) to jump ahead to a content location for a director; or taking other actions.

The content segment engine 202B may be configured to facilitate such substantially simultaneous presentation of a given "matter" by adaptively modifying one or more of the resolution, bit rate, content size, communications bandwidth utilized, communications link type used between the content server 102 and a given user device 104, or otherwise.

The content segment engine 202B may be configured to retrieve and synchronize presentation of additional content available from a given user device in order to facilitate an ICWP. Content engines 202B on the sync server 102 and the user devices 104 may be configured to communicate status information over the sync links 110 and may not need to utilize content links 112. A director may be configured to control any trick-mode operations, with users of participating user devices requesting trick-mode operations (such as PAUSE) via a chat link 114.

During an ICWP, two or more user devices may be configured to have trick-mode control capabilities. For an implementation, a selection of a trick-mode operation may result in a communication to the director 104-1 and/or sync server 102 to initiate the selected trick-mode operation with respect to one or more "matters."

Adaptive bitrate streaming sessions may be used between the sync server 102 and user device 104 to facilitate substantially simultaneous presentation of one or more "matters" during an ICWP. One or more adaptive bitrate streaming technologies may be utilized by the content segment engine 202B executing on the sync server 102 and on a player client/content engine executing on a given user device. Non-limiting examples of adaptive bitrate streaming technologies that may be utilized include MPEG-DASH, Adobe Systems HTTP Dynamic Streaming, Apple HTTP Live Streaming, Microsoft Smooth Streaming, and others. It is to be appreciated that by adaptively modifying the bitrate used to provide content to user device 104, given "matter" may be provided, decoded and presented on user device 104 substantially simultaneously during an ICWP.

For example, for a first user device 104-1 communicatively coupled to the sync server 102 using a 100 Mb/s connection, the sync server 102 provides a given "matter" at a 4K resolution over a first content link 112-1. Further and for a second user device 104-2 communicatively coupled to the sync server 102 then using a 15 Mb/s connection, the sync server 102 may provide the given "matter" at a 720p resolution over a second content link 112-2. By providing the given "matter" at the lower resolution it is to be appreciated that the reception and presentation of such "matter" may occur substantially simultaneously (assuming user device content processing times are equal).

Further, given that processing times for user devices for given "matters" may vary, the sync server 102 may use the content segment engine 202B, in conjunction with the sync engine 202A, to determine user device delays. Such user device delays may be determined, for example upon an initialization of a first watch party or upon an initialization of a first ICWP, whenever an ICWP is formed, or otherwise. User device delays may be determined based upon test content segments, initial content segments, or otherwise. User device delays may be suitably stored by the sync server 102 in data storage 204 as one or more user data 204A. User data 204A may further include information regarding a user device 104, preferences for a user associated with such user device, and other user device specific information.

Further, various connection data 204B may be stored in the data storage 204 and used by the sync server 102 in facilitating an (I)CWP. Non-limiting examples of such connection data include type of connection, distance of user device from sync server 102, maximum available bandwidth of the connection, throughput for the connection, latency, and other data. Connection data may be determined for a content link 112 on a once, repeated, or other basis. It is to be appreciated that a content link 112 may change as the location of a given user device 104 changes. For example, a user device 104 may participate in a first watch party, or (I)CWP from a home location using a high-speed Internet connection, while participating in a later arising (I)CWP using a 4G cellular connection. Accordingly, it is to be appreciated that connection data determined and stored and the frequency of such determining and storing may vary based upon a type of connection then being used by a given user device while participating in an (I)CWP. Such connection data may be used by the sync server 104 in initially configuring the content link between the sync server 102 and a given user device 104 and in reconfiguring, such as by adjusting a bitrate utilized, the content link used to facilitate presentation of content segments to multiple users during an ICWP.

The sync server 102 may be further configured to include content data 204C. For at least one implementation, content data 204C may include content segments from a previously occurring watch party. For at least one implementation, content segments for a given content presented during the previously occurring watch party may be stored on the sync server 102, on one or more user devices 104, and/or on the Cloud.

Content segments may be made available by a producer, publisher, distributor, or other source of such content. For example, a producer for a new television series may designate one or more content segments presented during a watch party available for use in an (I)CWP.

(I)CWPs may be used for promotional purposes. (I)CWPs may also be used for any lawful purpose; non-limiting examples including gambling, sporting contests, shopping, educational and training, cooking, or otherwise. For at least one implementation, (I)CWPs may be used for sporting contests, such as MARCH MADNESS, the OLYMPICS, the WORLD CUP, FORMULA 1 races, or otherwise to facilitate common viewing of previously presented content of particular interest to one or more users.

A sync server 102 may include information identifying "matters" that are stored on one more user devices 104 and presentable during an (I)CWP. Such "matters" are referred to herein as "pre-cached matter." Non-limiting examples of pre-cached matter may include commercials, segments of non-live programs, previously designated reactions, or otherwise. Pre-cached matter may be used by a sync server 102 to facilitate an ICWP by providing ready access thereto, by a given user device, when a given content link 112 is unreliable, of insufficient bandwidth, experiences undesirable latency, or otherwise. For at least one implementation, a sync server 102 may instruct a given user device 104 to access such pre-cached matter on an on-demand or otherwise basis. Such instructions may be provided, For at least one implementation, over one or more of the sync link 110 and/or the content link 112.

Chat Engine 202C

The sync server 102 (and/or one or more user devices 104) may be further configured to execute a chat engine 202C. The chat engine 202 may be configured to facilitate communications between user devices 104 during an ICWP. For at least one implementation, such communications may occur using a chat link 114. Such communications may take any form, such as audio, text message, emoticons, video, audio, GIFs, video, graphics, or otherwise. The chat engine 112 may facilitate user-to-user (or private) communications, user-to-multiple user (or semi-private) communications, user-to-all (or public) communications, or otherwise.

User communications occurring during an ICWP may be stored in data storage 204 as chat data 204D. Such chat data may be time stamped and/or otherwise synchronized with respect to a given content segment, prior reaction, later reaction, and/or additional content such that a later playback of such data may include chat data corresponding thereto, as such chat data was generated during the given ICWP. For example, a later viewing of content segments for the football program during an ICWP may include later reactions thereto by an Nth user. Such later reactions may be provided in chat data arising between a first user and a second user during the ICWP. Prior reactions may also be presented, assuming such prior reactions are presented during the ICWP. Such later synchronization and presentation of chat data may enable the Nth user to enjoy the highlights from the original watch party as if participating real-time even when such prior watch party may in fact have occurred earlier and the Nth user's reactions are captured as later reactions and associated with the content during the ICWP.

A chat link 114 may be provided as a sub-stream of a content link 112 and/or of a sync link 110 during an ICWP. The chat data communicated over the chat link 114 may be adaptively bitrate provided to the various users in the ICWP such that a user device 104 receives a given user's later reactions to a given "matter" at substantially the same time. For example, a video camera focused upon a first user (or group thereof) may adaptively bit-rate stream images (and audio) of such first user to other second users such that the later reactions of the first user, as presented to the second users, are in substantially simultaneous synch with the presentation of the given "matter" being presented to the first user and resulting in the given later reaction. Accordingly, and for at least one implementation, a chat link 114 may be configured to utilize higher speed communications links than are used to facilitate the content links 112 such that later reactions to "matter" may be in substantially simultaneous synchronization across two or more user devices participating in an ICWP. For at least one implementation, chat links 114 are provided using networks supporting high band 5G communications.

For at least one implementation, the chat engine 202C may be configured to jointly and/or separately associate prior reactions and later reactions with given content segments and/or (as appropriate) additional content. Such associations, prior reactions, and/or later reactions may be stored as chat data 204D in the data storage 204. Reactions may take any form and may include facial responses, audible responses, and otherwise.

Consolidation Engine 202D

The sync server 102 (and/or one or more user devices 104) may be further configured to execute a consolidation engine 202D. The consolidation engine 202D may be configured to facilitate selection of "matters" for (I)CWPs. For an (I)CWP, "matter" may be selected by the consolidation engine from previously stored content segments, prior reactions, later reactions, and matter designations (if any).

The consolidation engine 202D may be configured to receive "matter designations" from content sources 106 of "matters" presented in a previously occurring watch party or ICWP that correspond to one or more criteria. Non-limiting examples of criteria for matter designations may include popularity, most reactions, most viewed, most presented, length, content type, best of, funniest, scariest, informative, highest rated, fact verified, source verified, or otherwise. Such matter designations and criteria may be used by the consolidation engine 202D to facilitate an (I)CWP.

The consolidation engine 202D may be configured to facilitate selection of "matters" for an (I)CWP based upon tags provided by a content source 106. For example, a content source 106 may tag portions of a content based upon any criteria. Returning to the non-limiting football game example, the content source 106 may tag a given game based upon when various players, officials, fans or others are depicted, when certain actions occurs, (such as touchdowns, interceptions, sacks, fumbles, or the like), or otherwise. A content source 106 may provide tags that identify reactions (prior or later) that correspond to content segments and/or other forms of "matter." Any tag and tagging methodology may be used by a content source 106. A tag may correspond to a matter designation.

The consolidation engine 202D may be configured to select/tag given "matters" for presentation during an (I)CWP based upon prior reactions of one or more users during a watch party and, for ICWPs, based further upon later reactions. For a non-limiting example, facial recognition technologies may be used which capture and analyze one or more user's facial reactions to a content presented during a watch party. Such reactions may include, for example, raised eyebrows, smiling, frowning, closing or opening of eyes or ears, or otherwise. Such reactions may be captured separately or in conjunction with verbal reactions, such as yells, screams, sighs, or otherwise, physiological reactions such as elevated heart rates, sweating, or the like, and otherwise. Any reactions may be used for tagging purposes. Based upon such captured reactions, the consolidation engine 202D may identify certain content segments for use in an (I)CWP. The capture reactions may be further tagged.

The consolidation engine 202D may be configured to select tags for given "matters" based upon a transcript thereof. For example, transcripts of content dialog may be used to select/tag content segments therein. The consolidation engine 202D may be configured to select tags for given "matters" based upon gaps in dialog for a content, sounds associated with content (such as explosions, gunfire, or otherwise), and otherwise. The consolidation engine 202D may be configured to select tags for given "matters" based upon chat data associated with a watch party or an ICWP.

The consolidation engine 202D may be configured to use a buffer period arising before and after a given tagged event. For example, a prior reaction of a scream by a user, may be processed by the content source 106, a sync server 106, or otherwise to include content arising before (and giving rise to) the scream. Content occurring after the scream might be included or excluded. The amount of any pre-tag or post-tag buffer(s) may be preset, determined by a content source, user device, sync server, automatically determined (for example, using later occurring prior reactions or tags), or otherwise.

Using the one or more tags of "matter", the consolidation engine 202D may assemble "matter(s)" for presentation during an (I)CWP. The collection of assembled "matters" herein being a "watch party reel." For one implementation, the watch party reel may constitute a form of a "highlights reel" presentation, a "best of" presentation, or the like. Such assembling of "matters" in the watch party reel may include given content segments and/or other forms of tagged "matter" alone or in combination with other forms of "matter." For example, prior reactions to a given content segment may be combined for presentation during an (I)CWP. Additional "matter" so assembled for a watch party reel may be obtained from another content source, from pre-cached matter, from content data 204C, from chat data 204D, or otherwise.

The consolidation engine 202D may be configured to present watch party reels in accordance with one or more themes, styles, formats, technologies (e.g., augmented, virtual and standard reality), lengths, based upon user preferences (obtained, for example, from user data 204A), or otherwise. The consolidation engine 202D may be user controllable such that a watch party reel is presented according to a user selected style, length, format, or otherwise. A watch party reel for an (I)CWP may include use of additional content, such as additional music, sound effects, visual effects, or otherwise. A user device 104 may be configured to modify, adapt, or otherwise edit a watch party reel for presentation on the user device 104. Such editing may occur automatically or based upon user inputs.

The consolidation engine 202D may be configured to store tags, watch party reels, user settings, and other data as consolidation data 204E in the data storage 204.

The consolidation engine 202D may be configured to generate watch party reels as graphical information files (GIFs), compressed for online or world-wide-web viewing, configured for sharing via social media, formatted for standard, virtual, augmented, or other realities, compressed for transmission, storage, or otherwise, frame rate adjusted to fit a given presentation time window, such as thirty (30) seconds, one minute, or otherwise, adapted for use in commercials and/or advertisements in any media format, and otherwise.

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of embodiments and not limiting. Changes in detail or structure may be made without departing from the basic elements of the present disclosure as defined in the following claims.

What is claimed is:

1. A consolidated watch party system comprising:
a sync server;
a first user device communicatively coupled to the sync server by a first chat link, a first sync link, and a first content link;
at least one second user device communicatively coupled to the sync server by a second chat link, a second sync link, and a second content link;
wherein the sync server executes computer instructions instantiating a consolidation engine operable to:

assemble a combined watch party reel that includes a content segment and a prior reaction to the content segment;
output, using the first content link, the combined watch party reel to the first user device for presentation to a first user;
output, using the second content link, the combined watch party reel to the at least one second user device;
receive, using the first chat link and from the first user device, a later reaction;
transform the later reaction from a first format into a second format to generate a transformed later reaction;
send, via the second content link, and the transformed later reaction to the at least one second user device;
combine the content segment with the transformed later reaction into an interactive watch party reel;
wherein the interactive watch party reel is combined into a series of graphical information file (GIF) data packets; and
send the interactive watch party reel to a third user device;
wherein the transformed later reaction in the interactive watch party reel replaces the prior reaction in the combined watch part reel; and
wherein the sync server executes second computer instructions instantiating a chat engine operable to:
adaptively modifying a bit rate for the seond chat link to provide the transformed later reaction in lieu of the prior reaction, via the sync server, to the at least one second user device with a substantially simultaneous presentation, by the at least one second user device, of the content segment and the transformed later reaction.

2. The consolidated watch party system of claim 1, wherein the content segment includes a portion of a content presented during a watch party.

3. The consolidated watch party system of claim 2, wherein the prior reaction includes chat data captured, during the watch party, by a watch party user device; and
wherein the prior reaction is a user reaction to the content.

4. The consolidated watch party system of claim 3, wherein the prior reaction includes a facial response to the content.

5. The consolidated watch party system of claim 3, wherein the prior reaction includes an audible response to the content.

6. The consolidated watch party system of claim 1, wherein the consolidation engine is operable to select the content segment, from a collection of content segments, based upon a first tag associated with the content segment.

7. The consolidated watch party system of claim 6, wherein the first tag is generated by a content source which provided the content segment during the watch party.

8. The consolidated watch party system of claim 6, wherein the consolidation engine is operable to select the prior reaction, from a collection of prior reactions, based upon a second tag associated with the prior reaction.

9. The consolidated watch party system of claim 8, wherein the first tag and the second tag correspond to a matter designation; and wherein the matter designation corresponds to a criteria comprising at least one of: most popular, funniest, most viewed, highest rated, best of, scariest, informative, fact verified, and source verified.

10. The consolidated watch party system of claim 1, wherein the consolidation engine is operable to:
analyze chat data received previously from at least one of a first watch party user device and a second watch party user device during a prior watch party; and
tag the chat data according to a matter designation.

11. The consolidated watch party system of claim 10, wherein the chat data includes at least one of:
a facial response of a first user of the first watch party user device to the content segment; and
an audible response of the first user to the content segment.

12. The consolidated watch party system of claim 1, wherein the watch party reel further comprises a second content segment and a second prior reaction to the second content segment.

13. A server comprising:
a sync server operable to execute computer instructions instantiating one or more computer engines comprising:
a consolidation engine operable to assemble a first interactive watch party reel that includes a content segment and a prior reaction to the content segment;
a sync engine operable to:
adjust a first bit rate for the first interactive watch party reel to generate an adjusted first watch party reel;
output the adjusted watch party reel to a first user device; and
output the adjusted watch party reel to a second user device substantially simultaneously with the outputting of the adjusted watch party reel to the first user device;
receive a later reaction from the first user device;
transform the later reaction from a first format into a second format to generate a transformed later reaction;
combine the content segment with the transformed later reaction into a second interactive watch party reel;
wherein the second interactive watch party reel is generated into a series of graphical information file (GIF) data packets;
wherein, in the second interactive watch party reel, the transformed later reaction replaces the prior reaction included in the first interactive watch party reel; and
send the second interactive watch party reel to a third user device; and
a chat engine operable to:
receive the later reaction, to at least one of the content segment and the prior reaction, from the first user device; and
adapt a bit rate for a chat link coupling the second user device with sync server to facilitate substantially simultaneous presentation of the later reaction and the watch party reel on the second user device; and
wherein the content segment includes a portion of a content presented during a prior watch party.

14. The server of claim 13, wherein the prior reaction includes chat data captured during the prior watch party; and wherein the chat data includes at least one of a facial response and an audible response to the content.

15. The server of claim 13,
wherein the consolidation engine is further configured to:
select the content segment, from a collection of two or more content segments, based upon a first tag associated with the content segment; and
wherein the first tag is generated by a content source which provided the content segment during at least one of a prior watch party and an interactive consolidated watch party.

16. The server of claim 15,
wherein the consolidation engine is further configured to:
analyze chat data received previously from at least one of a first watch party user device and a second watch party user device during the prior watch party or the interactive consolidated watch party;
tag the chat data according to a matter designation;
identify the chat data as the prior reaction; and
select the prior reaction, from a collection of prior reactions, based upon the tag associated with the prior reaction.

17. The server of claim 16,
wherein the chat data includes at least one of:
a facial response of a first user of the first watch party user device to the content segment; and
an audible response of the first user to the content segment.

18. A method for facilitating interactive consolidated watch parties comprising:
forming by a server, a combined watch party reel including a combination of a content segment and a prior reaction selected from a previously occurring watch party;
wherein the content segment is tagged by a content source as corresponding to a matter designation; and
wherein the prior reaction is tagged by a server as corresponding to the matter designation;
outputting, by the server and using a first content link, the combined watch party reel to a first user device for presentation to a first user;
receiving, by the server and using a first chat link, a later reaction from the first user device;
transforming, by the server, the later reaction from a first format into a second format to generate a transformed later reaction; and
outputting, by the server and using a second content link, an interactive watch party reel to a second user device;
wherein the interactive watch party reel is output by the server as a series of Graphical Information File (GIF) data packets;
wherein the interactive watch party reel includes a second combination of the content segment and the transformed later reaction;
wherein the transformed later reaction is provided, in the interactive watch party reel, in lieu of the prior reaction provided in the combined watch party reel; and
adaptively modifying a bit rate for the second chat link to provide the transformed later reaction, in lieu of the prior reaction, to the second user device with a substantially simultaneous presentation, by the second user device, of the content segment and the transformed later reaction.

* * * * *